Figure 1:
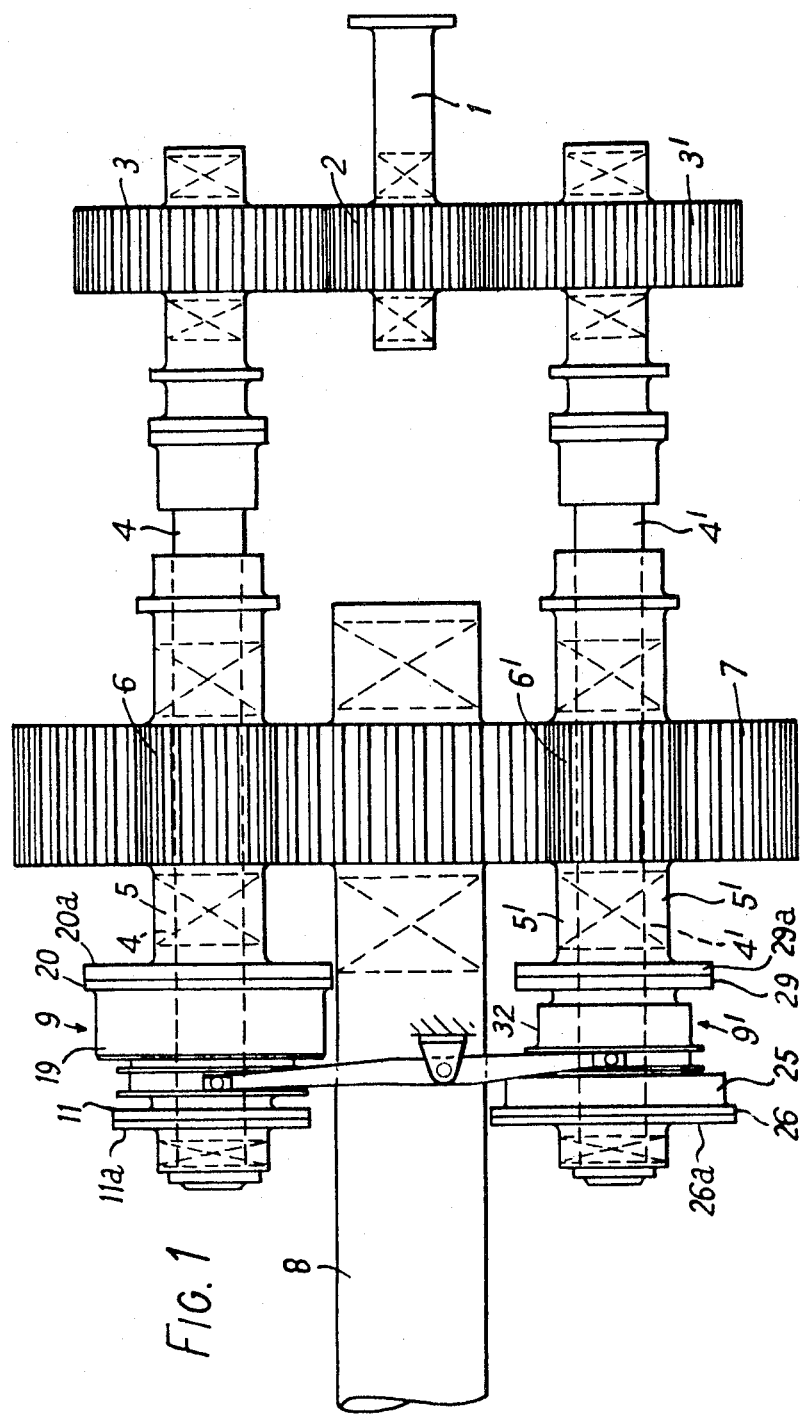

United States Patent

[11] 3,620,336

[72] Inventors Herbert Arthur Clements
Weybridge;
Robert H. Heybourne, East Molesey, both of England
[21] Appl. No. 13,479
[22] Filed Feb. 24, 1970
[45] Patented Nov. 16, 1971
[73] Assignee S.S.S. Patents Limited
Acton Town, London, England
[32] Priority Mar. 3, 1969
[33] Great Britain
[31] 11,191/98

[54] POWER TRANSMISSION SYSTEMS
9 Claims, 20 Drawing Figs.
[52] U.S. Cl. .................................................. 192/35,
74/339, 74/410, 192/48.92, 192/67 A
[51] Int. Cl. .......................................... F16d 21/00,
F16d 23/10
[50] Field of Search ........................................... 192/35,
48.92, 67 A; 74/410, 339

[56] References Cited
UNITED STATES PATENTS
3,326,056 6/1967 Clements et al. ............. 192/67 A X

*Primary Examiner*—Allan D. Herrmann
*Attorney*—Woodcock, Washburn, Kurtz & Mackiewicz ABSTRACT: A power transmission system with a main clutch and a subsidiary clutch in parallel. Each clutch has a toothed intermediate member that moves helically relative to one clutch part to bring its teeth into and out of driving engagement with clutch teeth on the other clutch part such that following partial driving interengagement of the clutch teeth the clutch becomes self-engaging. The main clutch has pawl and ratchet mechanism for initiating clutch engagement automatically upon relative rotation of the clutch input and output parts in one direction, and a lost motion connection is provided between the intermediate members of the clutches, so that the intermediate member of the subsidiary clutch is shifted into initial engagement by the intermediate member of the main clutch and the self-engaging action of the subsidiary clutch then relieves the intermediate member of the first clutch of load.

POWER TRANSMISSION SYSTEMS

This invention relates to power transmission systems incorporating toothed clutches.

There are requirements for a power transmission system wherein toothed clutches are arranged in parallel between an input shaft of the system and the output shaft of the system. An example of such a system is a locked train gear arrangement wherein toothed clutches are provided in each of two or more layshafts.

It is desirable that the clutches should engage conjointly for one direction of relative rotation of the input and output shafts of the system. However, if each of the clutches is a synchronous self-shifting clutch each with pawl and ratchet or equivalent mechanism such that the clutch engages automatically upon relative rotation of the clutch input and output parts in one direction, there is a likelihood that one clutch will engage fully before the other clutch or clutches has or have fully engaged, with the effect that the said other clutch or clutches will not then be capable of full engagement and the torque load will be transmitted only by the engaged clutch, thereby defeating the object of providing two or more clutches in parallel, namely of sharing the torque load between two or more clutches.

Consider the case of a locked train gear arrangement comprising two layshafts in each of which is provided a synchronous self-shifting clutch of the type comprising an intermediate member which during engagement and disengagement of the coacting clutch teeth moves helically relative to one of the clutch parts, and each clutch is provided with pawl and ratchet mechanism for initiating clutch engagement upon relative rotation of the clutch input and output parts. For successful operation of such a system it is essential that a pawl in one clutch should engage a ratchet tooth exactly simultaneously with the engagement of a pawl in the other clutch with a ratchet tooth, so that engagement of the clutches would be initiated simultaneously and the two clutches would be fully engaged simultaneously, hence the torque load would be shared equally between them. However, in practice there is a likelihood that the pawls in one clutch will be of slightly different angular phase, relative to their ratchet teeth, from the pawls of the other clutch relative to their ratchet teeth, such that when the relative rotation of the input and output shafts of the gearing is in the direction to engage the clutches, pawls of one clutch may engage associated ratchet teeth before pawls of the other clutch engage associated ratchet teeth. The effect will be that one clutch may become fully engaged whilst the other clutch is only partly engaged. Since the full engagement of one clutch prevents further relative rotation of the input and output shafts of the system in the direction to engage the clutches, the other clutch is unable to engage fully, hence the whole of the torque load is transmitted through the fully engaged clutch.

The object of the invention is to overcome this problem in a power transmission system comprising two or more clutches arranged in parallel between an input shaft and an output shaft.

In accordance with the invention there is provided a power transmission system comprising a main toothed clutch and at least one subsidiary toothed clutch; said main and subsidiary clutches being arranged in parallel between an input shaft of the system and an output shaft of the system, each of the clutches comprising a first rotary clutch part having clutch teeth, a second rotary clutch part and an intermediate member having clutch teeth and arranged for helical movement relative to one of said first and second clutch parts to bring its clutch teeth into and out of driving engagement with the clutch teeth of said first clutch part, such that following partial driving interengagement of the coacting clutch teeth the clutch is self-engaging, due to the interaction of the clutch teeth, only said main clutch having pawl and ratchet or equivalent mechanism for automatically initiating movement of its intermediate member in the direction for clutch engagement upon passage of the input and output parts through rotational synchronism due to relative rotation of said input and output shafts in one direction, said main and subsidiary clutches being mutually arranged to provide a shifting connection with lost motion between the intermediate members thereof such that during movement of the intermediate member of the main clutch to effect partial driving interengagement of the clutch teeth of the main clutch it shifts the intermediate member of the subsidiary clutch to effect partial driving interengagement of the clutch teeth of the subsidiary clutch and during the subsequent self-shifting action of the subsidiary clutch the lost motion takes effect to relieve the intermediate member of the main clutch of the load of shifting the intermediate member of the subsidiary clutch.

Figure 2:
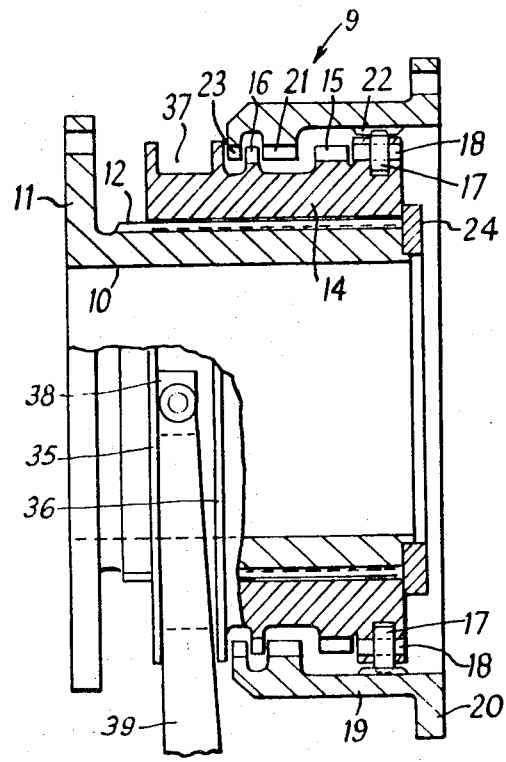
Figure 2:
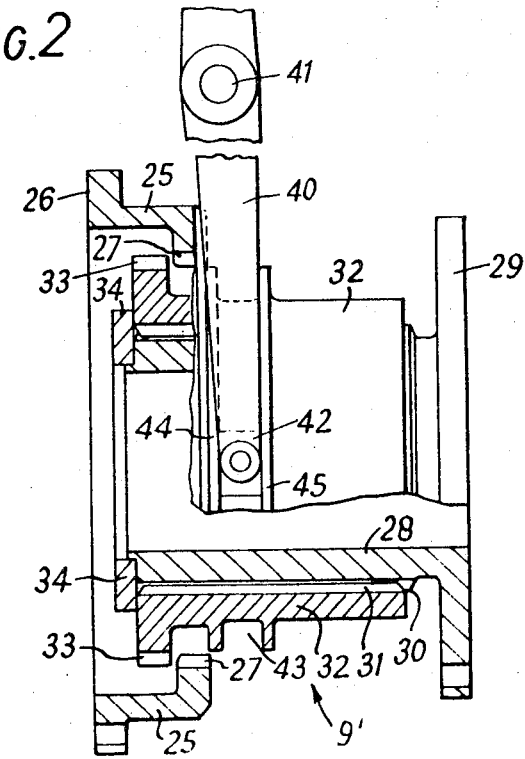
Figure 3A:
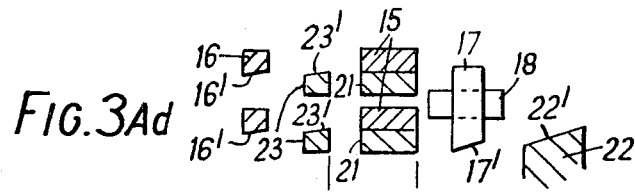
Figure 3A:
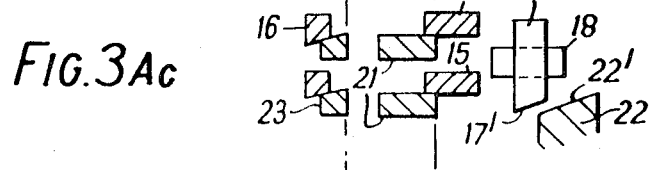
Figure 3A:
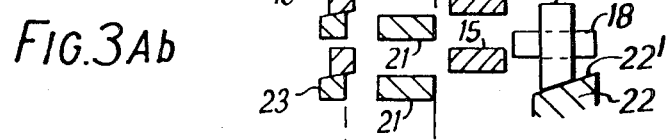
Figure 3A:
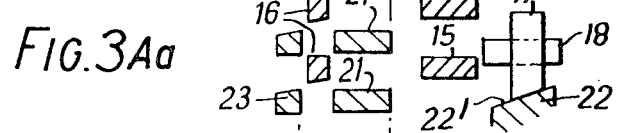
Figure 3A:
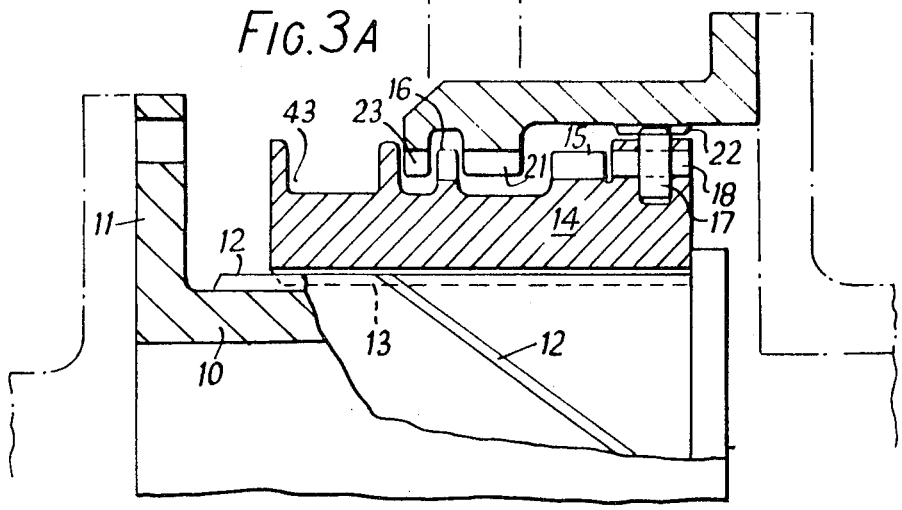
Figure 3B:
Figure 3B:
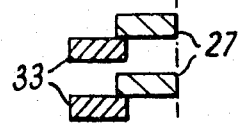
Figure 3B:
Figure 3B:
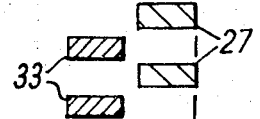
Figure 3B:
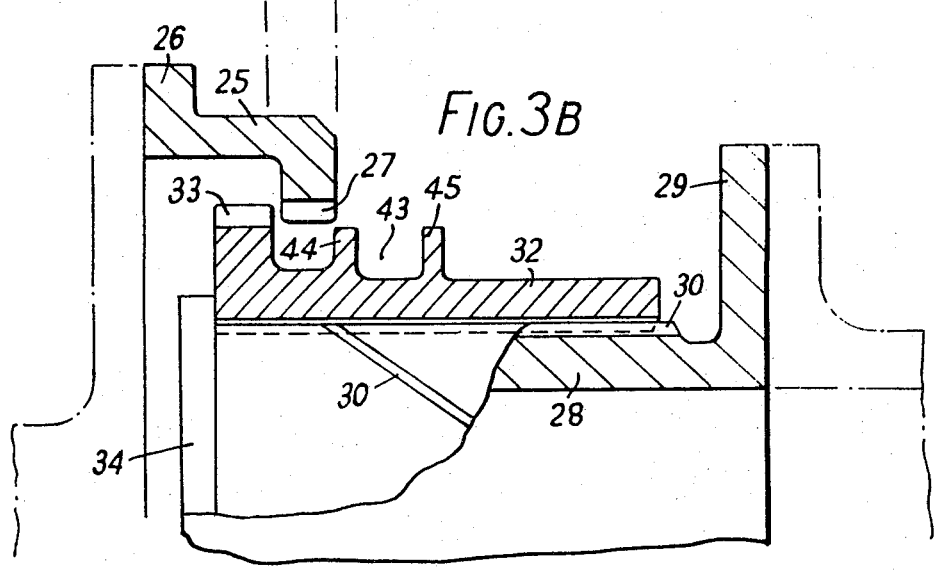
Figure 4D:
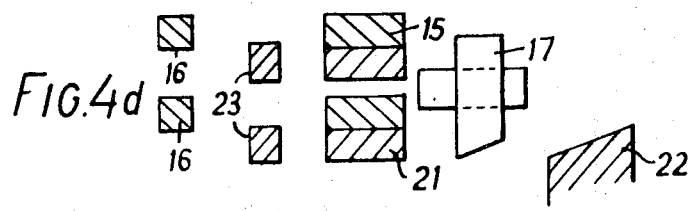
Figure 4C:
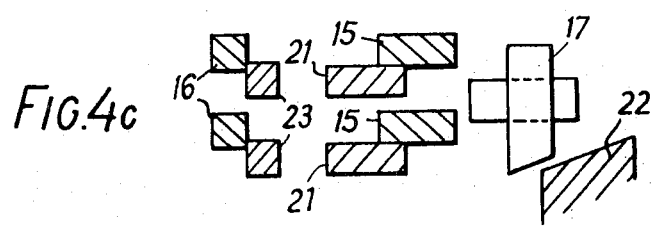
Figure 4B:
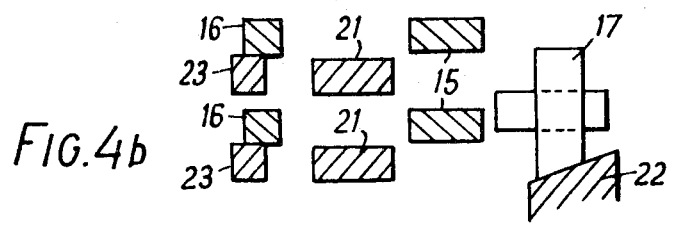
Figure 4A:
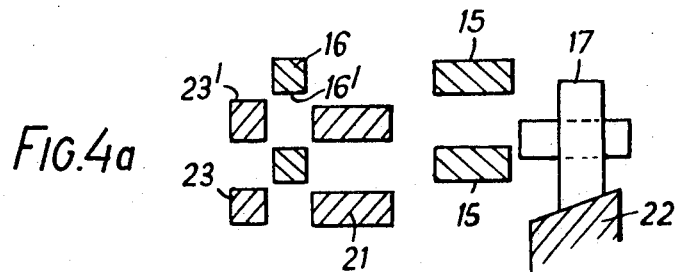
Figure 5A:
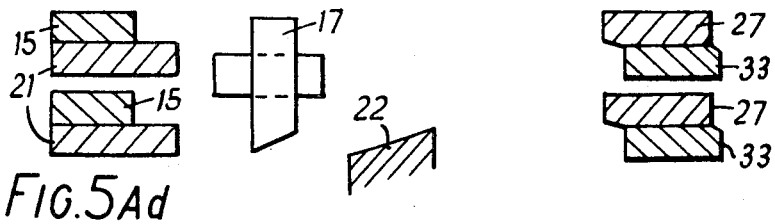
Figure 5A:
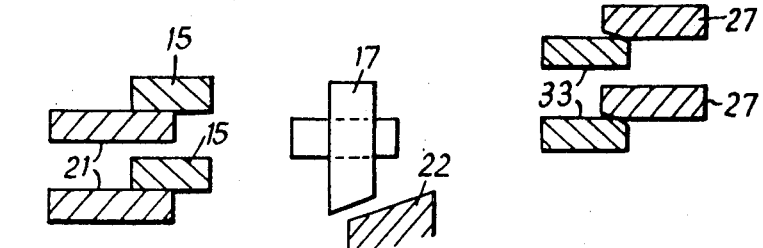
Figure 5A:
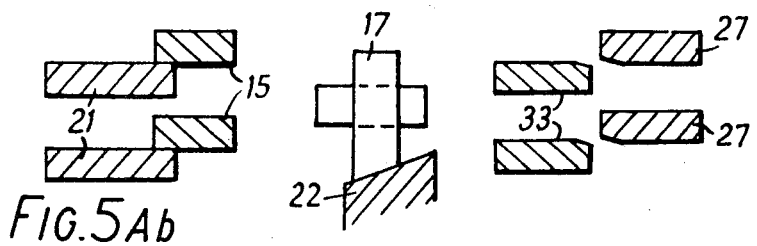
Figure 5A:
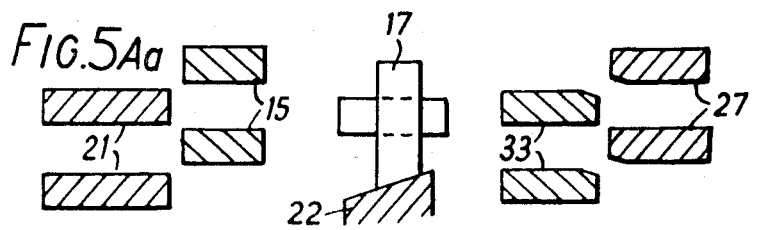

In the accompanying drawings:

FIG. 1 is a diagrammatic view of a locked train gear system incorporating the invention, FIG. 2 is a partly sectional side view of the main and subsidiary clutches incorporated in the gear system shown in FIG. 1, FIG. 3A is a view in longitudinal section of the upper half of the main clutch shown in the upper part of FIG. 2, FIGS. 3A*a* to 3A*d* are development views showing the relative positions of parts of this clutch at different stages of operation, FIG. 3B is a view in longitudinal section of the upper half of the subsidiary clutch shown in the lower part of FIG. 2, FIGS. 3B*a* to 3B*d* are development views showing the relative positions of parts of this clutch at different stages of operation, FIGS. 4*a* to 4*d* are development views showing transfer teeth used in another embodiment of the invention, and FIGS. 5A*a* to 5A*d* are development views showing clutch teeth used in a further embodiment.

The locked train gear system illustrated in FIGS. 1 to 3B*d* includes an input shaft 1 carrying a first reduction pinion 2 meshing with two similar gear wheels, 3, $3^1$ mounted respectively on parallel layshafts 4, $4^1$. The layshafts are surrounded by sleeve shafts 5, $5^1$ respectively carrying second reduction pinions 6, $6^1$ meshing with a gear wheel 7 on an output shaft 8. A toothed main clutch 9 is provided between the layshaft 4 and the sleeve shaft 5, and a toothed subsidiary clutch $9^1$ is provided between the layshaft $4^1$ and the sleeve shaft $5^1$.

The main clutch 9 is a synchronous self-shifting clutch. It includes (FIG. 2) a clutch input part constituted by a sleeve 10 formed with an external flange 11 bolted to a flange 11*a* on the layshaft 4, and formed with right-hand external helical splines 12, of e.g. 30° helix angle, with which engage internal helical splines 13 in an intermediate member 14. The intermediate member 14 is formed with a ring external clutch teeth 15 and with a ring of external transfer teeth 16, and carries pawls 17 mounted on pawl pins 18, the noses of the pawls 17 pointing in clockwise direction as seen in the end view from the left-hand side of FIG. 2. The output part of the clutch 9 is constituted by a substantially cylindrical member 19 with a flange 20 bolted to a flange 20*a* on the sleeve shaft 5 and formed with a ring of internal clutch teeth 21, a ring of internal ratchet teeth 22 and a ring of internal transfer teeth 23. With the clutch 9 disengaged as shown in FIG. 2 the intermediate member 14 is in a right-hand position adjacent an axial stop 24, and the pawls 17 are positioned for ratcheting relative to the ratchet teeth 22.

The internal and external clutch teeth 15 and 21 are straight, viz their driving faces are parallel to the clutch axis. The operative faces $22^1$ of the ratchet teeth 22 are chamfered in a left-hand helical sense, and the coacting faces $17^1$ of the noses of the pawls 17 are correspondingly chamfered. The coacting faces $16^1$ and $23^1$ of the transfer teeth are chamfered in a left-hand helical sense, but with a smaller helical lead than the faces $22^1$ and $17^1$ of the ratchet teeth and pawls.

The subsidiary clutch $9^1$ has a clutch input part constituted by a sleeve 25 formed with an external flange 26 bolted to a flange on the layshaft $4^1$, the sleeve 25 being formed with a ring of internal clutch teeth 27. The output part of the clutch $9^1$ is constituted by a sleeve 28 formed with an external flange 29 bolted to a flange on the sleeve shaft 5¹ and formed with external righthand external helical splines 30, e.g. of 30° helix angle with which engage internal helical splines 31 in an intermediate member 32 formed with a ring of axially straight external clutch teeth 33. In the disengaged condition of the clutch 9¹ (FIG. 2) the intermediate member 32 is in a lefthand position, adjacent an axial stop 34, with the external clutch teeth 33 to the left of the internal clutch teeth 27.

The intermediate member 14 of the clutch 9 has flanges 35, 36 forming an external annular groove 37 in which engages a block 38 which is pivotally connected to one end of a rocking lever 39, 40 which is pivotally mounted at a fixed but adjustable pivot point 41. The width of the block 38 is less than the width of the groove 37 so that there is lost motion in the axial sense between the intermediate member 14 and the end of the lever 39, 40 that carries the block 38. The other end of the rocking lever 39, 40 is pivotally connected to a block 42 which is engaged with a sliding fit in an external annular groove 43 formed between flanges 44 and 45 on the intermediate member 32 of the clutch 9¹, such that there is practically no lost motion between the said other end of the rocking lever 39, 40 and the intermediate member 32. The arm 39 of the rocking lever between the pivot point 41 and the intermediate member 14 of the clutch 9 is longer than the arm 40 between the pivot point 41 and the intermediate member 32 of the clutch 9¹.

With the input shaft 1 of the system in rotation relative to the rotation of the output shaft 8 such that the layshafts 4 and 4¹ rotate in anticlockwise direction as viewed from the lefthand side in FIG. 1 both clutches 9 and 9¹ are disengaged, the pawls 17 ratcheting relative to the ratchet teeth 22 (FIG. 2). When the direction of relative rotation of the input and output shafts 1 and 8 reverses, noses of pawls 17 engage ratchet teeth 22 (FIG. 3Aa). The gearing is arranged so that upon the engagement of noses of pawls 17 with ratchet teeth 22 the external clutch teeth 21 of the main clutch 9 are opposite the gaps between the internal clutch teeth 15, the external clutch teeth 33 of the subsidiary clutch 9¹ are opposite the gaps between the internal clutch teeth 27 (FIG. 3Ba), and the external transfer teeth 16 are opposite the gaps between the internal transfer teeth 23 (FIG. 3Aa). The engagement of pawls 17 with ratchet teeth 22 causes the intermediate member 14 of clutch 9 to be shifted to the left helically relative to the clutch input part 10. Owing to the lost motion above mentioned, during the initial part of the movement of the intermediate member 14 of the clutch 9 to the left the intermediate member 32 of the clutch 9¹ is not shifted. Following this initial part of the movement of the intermediate member 14 the external transfer teeth 16 enter into partial flanking engagement with the internal transfer teeth 23 and the chamfered faces 16¹ of the external transfer teeth 16 slide along the coacting chamfered faces 23¹ of the internal transfer teeth 23 (FIG. 3Ab), and owing to the different helical leads of the coacting faces of the transfer teeth 16 and 23 on the one hand and the coacting faces 17¹, 22¹ of the pawls 17 and ratchet teeth 22 on the other hand the noses of the pawls move away from contact with the ratchet teeth 22, hence they are relieved of load (FIG. 3Ac). During the continued helical movement of the intermediate member 14 of the clutch 9, which results from the interaction of the transfer teeth 16 and 23, the lost motion between the intermediate member 14 and the arm 39 of the rocking lever is taken up, and the intermediate member 32 of the clutch 9¹ begins to move to the right, the movement being helical relative to the sleeve 28, bringing its external clutch teeth 33 into partial interengagement with the internal clutch teeth 27, with clearances between the flanks 33¹, 27¹ of the teeth. During the subsequent conjoint movement of the intermediate members 14 and 32 of the two clutches, the external clutch teeth 15 and 33 of the clutches are permitted, by the sliding of the helical flanks 16¹ of the transfer teeth 16 along the helical flanks 23¹ of the transfer teeth 23, to come into partial flanking engagement (FIGS. 3Ac and 3Bc) with their coacting internal clutch teeth 21 and 27. The faces 16¹ of the external transfer teeth 16 then move axially away from the faces 23¹ of the internal transfer teeth 23 and hence become unloaded. The driving faces of the external clutch 15 and 33 of both clutches now slide axially along the driving faces of their coacting internal clutch teeth 21 and 27 into full driving engagement (FIGS. 3Ad and 3Bd). Full engagement of the two clutches occurs simultaneously, and further movement of the intermediate members 14 and 32 is prevented by the flanges 11 and 29 respectively so positioned as to ensure that the load is shared substantially equally by the two clutches.

Owing to the difference in lengths of the arms 39 and 40 of the rocking lever, as soon as the driving faces of the clutch teeth of both clutches come into partial engagement and the self-engaging motion of each intermediate member commences to be governed by the interaction of its associated clutch teeth, the rate of movement of the intermediate member 14 of the clutch 9 is lower than the rate of movement of the end of the arm 39 of the rocking lever coupled with lost motion to the intermediate member 14, so that the lost motion again comes into effect in that the intermediate member 14 ceases to engage the block 38, and the rocking lever is relieved of load.

The function of the pawls 17 with which only the main clutch 9 is provided is only to effect partial movement of the intermediate member 14 of the clutch 9 in the engaging direction as far as the condition of partial flank engagement of the coacting transfer teeth 16 and 23, after which the pawls 17 are unloaded. The pawls 17 play no part in initiating the engaging movement of the intermediate member 32 of the subsidiary clutch 9¹, movement being initiated by the intermediate member 14 of the clutch 9 acting through the rocking lever 39, 40.

FIGS. 4a to 4d illustrate a modification in which the transfer teeth 16 and 23 have straight coacting faces 16¹ and 23¹. In this case, when the clutch teeth 27 and 33 have entered in partial interengagement with clearances the transfer teeth 16 continue to slide relative to the transfer teeth 23 and then move axially off them so as to permit the clutch teeth 27 and 33 to enter into partial driving interengagement (FIG. 4c), the self-engaging actions of the clutches then bringing both clutches into a condition of full driving engagement.

In a further embodiment, illustrated in FIGS. 5a to 5d, the transfer teeth are omitted, and corners of the coacting clutch teeth 27 and 33 of the clutch 9¹ are chamfered as shown such that when the lost motion between the intermediate member 14 of the main clutch 9 and the arm 39 of the rocking lever is taken up and the intermediate member 32 of the subsidiary clutch 9¹ begins to move to the right its external clutch teeth 33 are brought into partial interengagement with its internal clutch teeth 27, but with clearances between the chamfered corners. During the subsequent conjoint movement of the intermediate members 14 and 32 the driving faces of the external clutch teeth of both clutches slide axially along the driving faces of their coacting internal clutch teeth into full driving engagement, full engagement of the two clutches occurring simultaneously, whereupon further movement of the intermediate members is prevented by the flanges 11 and 29. The clutch teeth 21 are longer than the clutch teeth 15 to allow for full flanking engagement of the teeth of the subsidiary clutch 9¹.

In another embodiment of the invention (not illustrated) the arms 39 and 40 of the rocking lever are of equal length, and the lead of the helical splines 30 and 31 of the clutch 9¹ is greater than that of the helical splines 12 and 13 of the clutch 9 such that when the coacting clutch teeth of the clutches 9 and 9¹ come into partial driving engagement and the intermediate members 14 and 32 are drawn along their respective helical splines into their positions of full-toothed engagement by the interaction of the associated coacting sets of clutch teeth the intermediate member 32 of the clutch 9¹ moves axially at a faster rate than the intermediate member 14 of the clutch 9, thereby relieving the intermediate member 14 and rocking lever 39, 40 of load.

This principle of using helical splines of different leads in the clutches may be applied to an arrangement in which the main clutch 9 and subsidiary clutch 9¹ are arranged coaxially. With both clutches disengaged the intermediate members 14 and 32 are spaced axially from one another. Initial movement of the intermediate member 32 of the clutch 9¹ into a position of interengagement of its coacting clutch teeth with clearances on the flanks thereof is effected by end-to-end butting engagement of the intermediate member 14 of the clutch 9 with the intermediate member 32 of the clutch 9¹. The lead of the helical splines of the subsidiary clutch 9¹ is greater than that of the helical splines of the main clutch 9, such that when the coacting sets of clutch teeth of the clutches 9 and 9¹ come into partial driving engagement and the intermediate members 14 and 32 are drawn into their positions of full-toothed engagement by the interaction of their associated coacting sets of clutch teeth the intermediate member 32 of the clutch 9¹ moves axially away from the intermediate member 14 of the clutch 9, thereby relieving the intermediate member 14 of the load of shifting the intermediate member 32.

What is claimed is:

1. A power transmission system comprising an input shaft, an output shaft, a main clutch and a subsidiary clutch arranged in parallel between said input shaft and said output shaft, each of said clutches being of the type comprising a first rotary clutch member, clutch teeth carried by said first clutch member, a second rotary clutch member, an intermediate member, clutch teeth carried by said intermediate member, and means constraining said intermediate member for helical movement relative to said second clutch member to bring its clutch teeth into and out of driving interengagement with the clutch teeth carried by said first clutch member, such that following partial driving interengagement of the coacting clutch teeth the clutch is self-engaging due to the interaction of the clutch teeth, only said main clutch including means for automatically initiating movement of the intermediate member of said main clutch in the direction for engagement of said main clutch upon passage of the first and second clutch members of said main clutch through rotational synchronism due to relative rotation of said input and output shafts in one direction, the improvement including a lost motion driving connection between the intermediate members of the clutches, which driving connection is operative, during movement of the intermediate member of the main clutch to effect partial driving interengagement of the clutch teeth of the main clutch, to shift the intermediate member of the subsidiary clutch to bring about partial driving interengagement of the clutch teeth of the subsidiary clutch, and means operative during the subsequent self-engaging action of the subsidiary clutch to bring the lost motion into effect.

2. A power transmission system according to claim 1 wherein the said means for automatically initiating movement of the intermediate member of the main clutch include pawls carried by one of first and intermediate members of the main clutch and ratchet teeth carried by the other of said first and intermediate members of the main clutch, the system including means operative during the clutch engaging movement of the intermediate member of the main clutch to relieve said pawls and ratchet teeth from load before said lost motion driving connection begins to shift the intermediate member of the subsidiary clutch in the direction for engagement of the subsidiary clutch.

3. A power transmission system according to claim 1 wherein said lost motion driving connection includes a lever, means pivotally mounting said lever to provide lever arms of unequal lengths, means providing a driving connection between one of said lever arms and the intermediate member of the main clutch, and means providing a driving connection between the other of said lever arms and the intermediate member of the subsidiary clutch, at least one of said driving connections being a lost motion driving connection.

4. A power transmission system according to claim 1 wherein said lost motion driving connection includes a lever, means pivotally mounting said lever to provide two lever arms, means providing a driving connection between one of said lever arms and the intermediate member of the main clutch, and means providing a driving connection between the other of said arms and the intermediate member of the subsidiary clutch, at least one of said driving connections being a lost motion driving connection, with the feature that the lead of the helical motion of the intermediate member of the main clutch relative to the second member of the main clutch is different from the lead of the helical motion of the intermediate member of the subsidiary clutch relative to the second clutch member of the subsidiary clutch.

5. A power transmission system according to claim 1 including means whereby the shifting of the intermediate member of the subsidiary clutch by the intermediate member of the main clutch effects partial interengagement of the coacting clutch teeth of the subsidiary clutch with rotational clearances, followed by the said partial driving interengagement of the clutch teeth of the subsidiary clutch.

6. A power transmission system according to claim 1 including sets of transfer teeth carried respectively by the intermediate member of said main clutch and the said first clutch member of said main clutch, said sets of transfer teeth having coacting faces mutually arranged to enter into partial flanking interengagement before said lost motion is taken up and then to slide relatively to one another to produce partial interengagement of the clutch teeth of the subsidiary clutch with rotational clearances, followed by axial disengagement of one set of transfer teeth from the other set to permit the said partial driving interengagement of the clutch teeth of said subsidiary clutch.

7. A power transmission system according to claim 1 including sets of transfer teeth carried respectively by the intermediate member of said main clutch and the said first clutch member of said main clutch, said sets of transfer teeth having coacting faces mutually arranged to enter into partial flanking engagement before the said lost motion is taken up and then to slide relatively to one another to produce partial interengagement of the clutch teeth of the subsiding clutch with rotational clearances, followed by further relative sliding of said sets of transfer teeth to permit the said partial driving interengagement of the clutch teeth of said subsidiary clutch.

8. A power transmission system according to claim 1 wherein the driving flanks of the clutch teeth of said subsidiary clutch are chamfered such that the shifting of the intermediate member of the subsidiary clutch by the intermediate member of the main clutch effects partial interengagement of the coacting clutch teeth of the subsidiary clutch with rotational clearances, followed by the said partial driving interengagement of the clutch teeth of the subsidiary clutch.

9. A power transmission system comprising an input shaft, an output shaft, a main clutch and a subsidiary clutch arranged in parallel between said input shaft and said output shaft, each of said clutches being of the type comprising a first rotary clutch member, clutch teeth carried by said first clutch member, a second rotary clutch member, an intermediate member, clutch teeth carried by said intermediate member, and means constraining said intermediate member for helical movement relative to said second clutch member to bring its clutch teeth into and out of driving interengagement with the clutch teeth carried by said first clutch member, such that following partial driving interengagement of the coacting clutch teeth the clutch is self-engaging due to the interaction, only said main clutch including means for automatically initiating movement of the intermediate member of the main clutch in the direction for engagement of the main clutch upon passage if the first and second clutch members of the main clutch through rotational synchronism due to relative rotation of said input and output shafts in one direction, the improvement including means mounting said main and subsidiary clutches in relative positions such that with the clutches disengaged the intermediate members of the clutches are axially spaced from one another and such that during movement of the intermediate member of the main clutch into a position of partial driving interengagement of the clutch teeth of the main clutch it moves towards and then shifts the intermediate member of the subsidiary clutch to a position of partial driving interengagement of the clutch teeth of the subsidiary clutch, with the feature that the lead of the helical motion of the intermediate member of the subsidiary clutch relative to the second clutch member of the subsidiary clutch is greater than the lead of the helical motion of the intermediate member of the main clutch relative to the second clutch member of the main clutch, with the effect that the self-engaging motions of the intermediate members cause them to separate axially.

* * * * *